Jan. 15, 1946.   R. C. MARTIN   2,392,992
SUIT AND METHOD OF MAKING
Filed Sept. 15, 1943

Inventor
Ralph C. Martin

By

Attorney

Patented Jan. 15, 1946

2,392,992

UNITED STATES PATENT OFFICE 2,392,992

SUIT AND METHOD OF MAKING

Ralph C. Martin, Cuyahoga Falls, Ohio, assignor to Wingfoot Corporation, Akron, Ohio, a corporation of Delaware Application September 15, 1943, Serial No. 502,509

6 Claims. (Cl. 18—48)

This invention relates to an accordion-pleated tube, such as an accordion-like arm or leg, etc., for a pressure suit, and includes the method of manufacturing the same. Accordion-like members are known in the art. Strap tension members or the like have been fastened on each side of such accordions to limit their longitudinal expansion while permitting them to be flexed transverse the plane which passes through both of the tension members. In the manufacture of the leg of such a suit, for example, one steel cable has been run on the outside of the leg and another on the inside so that the leg may easily be flexed at the knee.

According to this invention, the fabric used in making the suits is a fabric which has been rubberized or treated with another curable plastic, and it is cured so as to be permanently set in the shape of the accordion pleats. In forming the accordion pleats, restraining hoops or grommets are slipped over a tube of the fabric and fastened at spaced intervals. Then the tube is inflated, and it bulges out between the hoops. The heat-softening of the rubber during cure permits a re-shifting of the thread angles in the areas of the fabric between the hoops, and on completing the vulcanization, the rubber and fabric become set in the accordion-like pattern.

Figure 1:
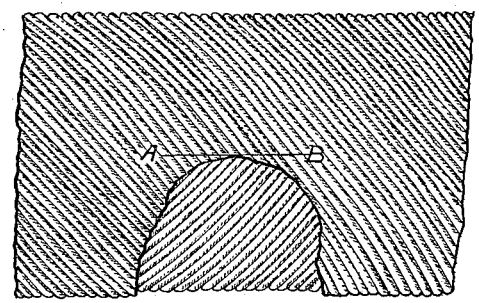
Figure 2:
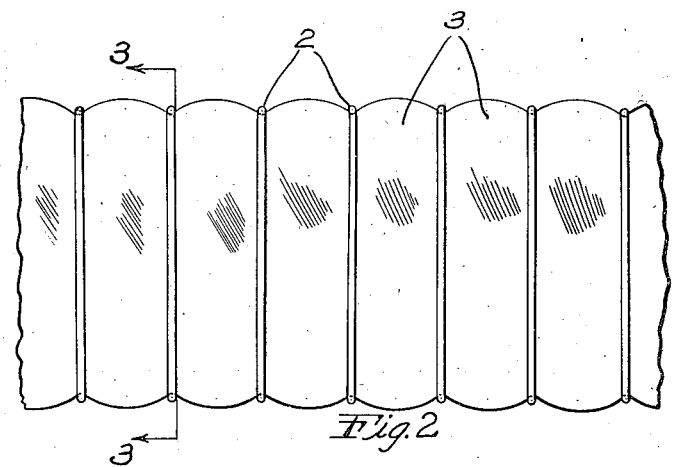
Figure 3:
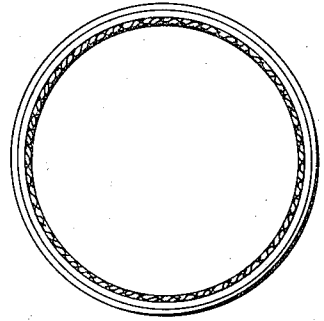

The invention will be further described in connection with the accompanying drawing. Fig. 1 shows in perspective a tube of the two-ply, pickless fabric from which the accordion-pleated section is to be formed, with a portion of the outer ply broken away. Fig. 2 is a side view, and Fig. 3 is a sectional view of the accordion-pleated member.

Originally, the cords in the tube make an angle appreciably less than 54° 44' with the straight line A—B, which is parallel to the axis of the tube. This is shown in Fig. 1. Instead of forming the tube of two plies of pickless fabric placed at an angle to one another, as illustrated, it may be made of square-woven fabric, such as basket weave, etc.

A tube in which the cords make an angle of less than 54° 44' with the axis is unstable when inflated. On inflation, such a tube tends to increase in diameter and shorten in length. The tendency to increase in diameter and shorten in length decreases as the angle approaches 54° 44'. At this angle there is no longer any tendency to increase in diameter or shorten in length on inflation of the tubes. If the cords lie at a greater angle than this to the axis, there is a tendency for the tube to decrease in diameter and increase in length when inflated.

In producing the sleeve of this invention, a tube is manufactured in which the angle is considerably less than 54° 44'. The fabric is coated with rubber or some equivalent plastic which sets on curing. Before curing, hoops 2 are slipped over the tube and are held in place by gum strips, tape or sewing.

When the loops have been fastened in place, the uncured fabric is inflated. This causes the portions 3 of the tube between the hoops 2 to increase in diameter and shorten in length. When the fabric is warmed during the initial portion of the cure, the plastic softens, and the cords shift in such a way as to increase the angle between them and a line parallel with the axis of the tube. The increase is greatest at the mid points between the hoops and gradually lessens as the cords approach the hoops. The angle never becomes greater than 54° 44' at the mid points. The cure is then completed, and the cords become permanently set in this new relation.

The space between the hoops or grommets may vary, but, in general, a distance of about 2 or 3 inches between them will prove satisfactory. After curing, a member made in this manner will be found stable to inflation forces and will have the desired accordion-like action. Tubes formed in this manner are satisfactory for use as arms or legs in a pressure suit. If a nonstretchable member, such as a wire, is united to each of the hoops on each side of the member or to the fabric at the mid points between the hoops where the diameter is greatest, or if these points are united by straps of elastic material, it will be found that the resulting member may easily be bent transverse the plane which passes through the two restraining members and that after bending, the member may easily be straightened out again.

What I claim is:

1. The method of producing a rubber-coated, accordion-pleated tube which comprises spacing hoops around a tube of fabric in which the textile elements make an angle appreciably less than 54° 44' with the axis of the tube, the fabric being coated with uncured rubber or the like, inflating the tube and softening the rubber by heating, thus permitting the textile elements between the hoops to shift so that near the mid points between the hoops the angle is appreciably increased, and then curing the rubber to cause it to take a permanent set.

2. The method of producing a tubular member for an inflatable pressure suit and the like formed of at least one ply of fabric in which the textile elements are bonded together by a heat softenable plastic material and arranged at an acute angle with respect to the axis of the tubular member, according to which the resulting tubular member will be both laterally and longitudinally stable upon inflation, said method including the steps of restricting the tubular member at a plurality of substantially equally spaced points along its length, inflating the tubular member causing the fabric to balloon slightly between the several restrictions, warming the tubular member while inflated to soften the plastic bonding material thereby enabling the textile elements to readjust themselves by increasing their angular relationship with respect to the axis of the tubular member whereby the tendency of the tubular member to increase in diameter and shorten in length when inflated is minimized, and thereafter causing the plastic material to assume a permanent set.

3. The method of producing a tubular member for an inflatable pressure suit and the like formed of a plurality of superposed plies of fabric in which the textile elements are bonded together by uncured rubber and arranged at an acute angle to the axis of the tubular member, according to which the resulting tubular member will be both laterally and longitudinally stable upon inflation, said method including the steps of encircling the generally tubular member with a plurality of substantially equally spaced restricting means, inflating the tubular member against the restricting means, heating the tubular member while inflated to soften the rubber employed in bonding the textile elements of the fabric together thereby permitting said textile elements between the restricting means to readjust themselves so that the angle formed between said textile elements and the axis of the tubular member is increased near the midpoints between the restricting means minimizing the tendency of the tubular member to increase in diameter and shorten in length when inflated, and thereafter curing the tubular member until the rubber bonding material assumes a permanent set.

4. As an article of manufacture, a portion of an inflatable pressure suit and the like embodying a tubular member characterized by maximum flexibility and a minimum of lateral and longitudinal growth under inflation, said tubular member comprising at least one ply of fabric in which the textile elements or cords are bonded together by means of a heat softenable plastic material, said fabric having formed therein a plurality of accordion pleats arranged adjacent each other and extending circumferentially of the tubular member, and a plurality of restricting means encircling the tubular member, said restricting means being disposed in substantially equally spaced relation axially thereof to define the accordion pleats within each of which the angular relationship of the cords comprising the fabric with respect to the axis of the tubular member is greater at the midpoint than at the extremities thereof and is maintained by the setting of the plastic bonding material.

5. As an article of manufacture, a generally tubular member which possesses flexibility as well as both lateral and longitudinal stability under inflation, said tubular member comprising a plurality of superposed plies of fabric in each of which the textile elements or cords are bonded together in substantially parallel relation by means of a heat softenable plastic material and having a plurality of restricting means disposed about the outer periphery of the tubular member, said restricting means being arranged in substantially equally spaced relation axially thereof to define in the tubular member a plurality of accordion pleats in which the angular relationship of the cords comprising the fabric with respect to the axis of the tubular member is less adjacent the restricting means than that in the intermediate portions of the fabric and is prevented from readjustment by the setting of the plastic material.

6. As an article of manufacture, a generally tubular member which possesses flexibility as well as both lateral and longitudinal stability under inflation, said tubular member comprising superposed plies of pickless rubberized fabric in which the textile elements or cords are bonded together solely by uncured rubber compound, and a plurality of annular means arranged in substantially equally spaced relation extending axially of said tubular member and defining a plurality of accordion pleats within each of which the angular relationship of the cords comprising the fabric with respect to the axis of the tubular member is no greater than 54° 44' intermediate the spaced annular means and appreciably less than 54° 44' adjacent said annular means, said relationship being maintained by the cured rubber compound.

R. C. MARTIN.